No. 787,356.

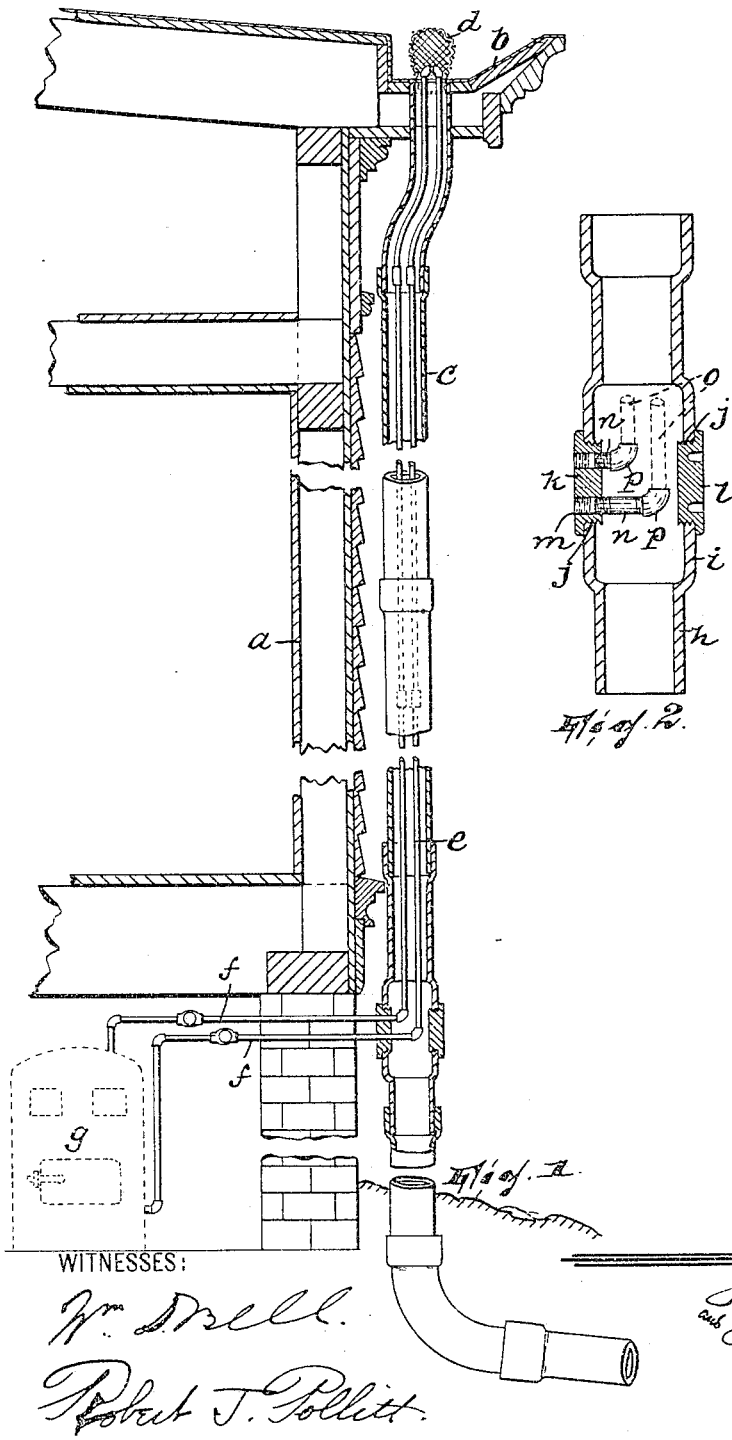

Patented April 18, 1905.

UNITED STATES PATENT OFFICE.

JOHN COLLINS AND JOHN FRALEY, OF PATERSON, NEW JERSEY.

MEANS FOR HEATING AND MELTING.

SPECIFICATION forming part of Letters Patent No. 787,356, dated April 18, 1905.

Application filed February 16, 1904. Serial No. 193,865.

*To all whom it may concern:*

Be it known that we, JOHN COLLINS and JOHN FRALEY, citizens of the United States, residing in Paterson, in the county of Passaic and State of New Jersey, have invented certain new and useful Improvements in Means for Heating and Melting; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has for its object to provide means for preventing water from freezing and for removing ice which forms in or around water-pipes. A practical, easily-installed, and readily-repaired expedient such as this is needed, for instance, in connection with the pipes called "leaders," employed for carrying off water from the roofs of buildings where in cold weather the ice or snow on the roof of a building melts from the heat within and, turning to water, constantly freezes as it slowly trickles down the leader until a mass is formed which ultimately clogs the pipe and sometimes bursts it.

Our invention consists in certain improvements in such apparatus looking toward making the same economical, easily installed, and readily repaired.

The invention is illustrated in the accompanying drawings in the single adaptation thereof above alluded to; but it will of course be understood that it has many other applications.

In the accompanying drawings, Figure 1 is a view illustrating our invention in connection with the leader of a building, the view being partly in section and partly in elevation; and Fig. 2 is an enlarged vertical sectional view showing a part of what is illustrated in Fig. 1.

In said drawings, $a$ designates a building having the usual roof-gutter $b$ and a sectional leader $c$, extending down from the roof-gutter and adapted to be connected at the bottom in the usual manner with a sewer or other outlet. This leader is protected at the top by a strainer or other form of perforated cowl $d$ for preventing leaves and other obstructions from entering the leader.

Into the leader $c$ is extended the conductor $e$ for a heat-carrying medium. In the adaptation shown this consists of piping, which is led in preferably near the bottom portion of the leader and extends up to the top and then back again, being connected at its ends with a steam-generator $g$.

In Fig. 2 we show in detail the preferable manner of assembling the leader $c$ and the system of piping $e$. The section $h$ of the leader, through the wall of which the system of piping enters, is enlarged to form a chamber $i$, and this chamber is formed at diametrically opposite points with threaded openings $j$, into which are fitted screw-plugs $k$ $l$. The screw-plug $k$ has threaded holes $m$ tapped through it, into which from one side are screwed the portions of the system $f$ leading into the building to the generator and from the other side the portions $n$ of said system, which latter are connected with the vertical portion or loop $o$ of the system by elbows $p$.

The screw-plug $l$ is provided so that access may be had to the interior of the leader for the purpose of clearing the same of such obstructions as may find their way into the leader and lodge where the system of piping passes out of the leader or elsewhere.

It is preferable to construct the system of piping $e$ in sections, so that it may be built up to any height—that is to say, approximating that of the leader.

Having thus fully described our invention, what we claim as new, and desire to secure by Letters Patent, is—

The combination of a water-conducting pipe, said pipe having a removable section provided with an enlarged portion forming a chamber in the pipe and said chamber having diametrically-opposed openings, plugs screwed into said openings and one of them having holes therethrough, and a tubular conductor for a heat-carrying medium having one section thereof disposed outside of said pipe and mounted at its ends in said holes in the plug and another section thereof disposed inside of said pipe and extending throughout substantially the length thereof, said lastnamed section comprising a vertical loop-shaped portion, substantially horizontal portions having their ends respectively mounted in said holes in the plug, and elbows connecting said portions, substantially as described.

In testimony that we claim the foregoing we have hereunto set our hands, JOHN COLLINS this 10th day of February, 1904, and JOHN FRALEY this 11th day of February, 1904.

JOHN COLLINS.
JOHN FRALEY.

Witnesses:
JOHN W. STEWARD,
ROBERT J. POLLITT.